United States Patent
Malakuti et al.

(10) Patent No.: US 11,971,702 B2
(45) Date of Patent: Apr. 30, 2024

(54) PRODUCTION LINE FOR MANUFACTURING A PART OF A VEHICLE

(71) Applicant: ABB Schweiz AG, Baden (CH)

(72) Inventors: Somayeh Malakuti, Dossenheim (DE); Prerna Juhlin, Heidelberg (DE); Sten Gruener, Ilvesheim (DE); Johannes Schmitt, Ladenburg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/069,878

(22) Filed: Oct. 14, 2020

(65) Prior Publication Data
US 2021/0109506 A1   Apr. 15, 2021

(30) Foreign Application Priority Data
Oct. 15, 2019 (EP) .................. 19 203 395

(51) Int. Cl.
*G05B 19/416* (2006.01)
*G05B 19/4155* (2006.01)

(52) U.S. Cl.
CPC ..... *G05B 19/4166* (2013.01); *G05B 19/4155* (2013.01); *G05B 2219/37574* (2013.01); *G05B 2219/40554* (2013.01)

(58) Field of Classification Search
CPC ............ G05B 19/4166; G05B 19/4155; G05B 2219/37574; G05B 2219/40554;
(Continued)

(56) References Cited

U.S. PATENT DOCUMENTS 9,740,896 B1   8/2017   Ben-Bassat et al.
2015/0034703 A1*  2/2015   Tanaka ................. B23K 37/04
                                                   228/182
(Continued)

FOREIGN PATENT DOCUMENTS

CA        2725065 A1    11/2009
CN      101201606 A     6/2008
(Continued)

OTHER PUBLICATIONS

Roland Rosen et al "About the Importance of Autonomy and Digital Twins for the Future of Manufacturing" IFAC-PAPERSONLINE, Aug. 31, 2015, pp. 567-572.
(Continued)

*Primary Examiner* — Eric J Yoon
*Assistant Examiner* — Mohammed Shafayet
(74) *Attorney, Agent, or Firm* — Leydig, Voit & Mayer, Ltd.

(57) ABSTRACT

A production line for manufacturing a building block, which includes at least one component, the production line including: a central conveyor line; at least one feeding line for feeding the at least one component to the central conveyor line; a manufacturing tool set for processing the at least one component; and a control unit for controlling the central conveyor line, the feeding line, and/or the manufacturing tool set. The controlling at least one of the central conveyor line, the feeding line, and/or the manufacturing tool set includes: retrieving an asset-information about the at least one component and/or the manufacturing tool set, conveying the at least one component according to the asset-information by the feeding line to the central conveyor line, retrieving a processing-information and/or a manufacturing tool set information about processing the at least one component, (Continued)

and processing the at least one component by the manufacturing tool set.

17 Claims, 6 Drawing Sheets

(58) Field of Classification Search
CPC ........... G05B 2219/32127; G05B 2219/32157; G05B 2219/32161; G05B 2219/31268; G05B 2219/32118; G05B 2219/31324; G05B 19/4183; Y02P 90/02; G06F 16/256; G06N 5/022
See application file for complete search history.

(56) References Cited

U.S. PATENT DOCUMENTS

| | | | |
|---|---|---|---|
| 2016/0132040 A1* | 5/2016 | Noguchi | G05B 19/41805 700/118 |
| 2016/0167247 A1* | 6/2016 | Gallagher | G05B 19/182 700/145 |
| 2017/0088207 A1* | 3/2017 | Lay | B29C 63/02 |
| 2017/0337283 A1* | 11/2017 | Bliss | H04L 67/10 |
| 2018/0339456 A1* | 11/2018 | Czinger | G05B 19/418 |
| 2019/0186889 A1* | 6/2019 | Jammalamadaka | G01B 5/004 |
| 2019/0236489 A1 | 8/2019 | Koudal et al. | |
| 2020/0257853 A1* | 8/2020 | Hussain | G06F 11/302 |
| 2021/0034826 A1* | 2/2021 | Hong | G06K 7/10138 |

FOREIGN PATENT DOCUMENTS

| | | |
|---|---|---|
| CN | 107026894 A | 8/2017 |
| CN | 109690891 A | 4/2019 |
| EP | 3057044 A1 | 8/2016 |
| EP | 3062182 A1 | 8/2016 |
| JP | 8-118209 A | 5/1996 |
| JP | 2016-000446 A | 1/2016 |

OTHER PUBLICATIONS

Fei Tao et al "Digital twin-driven product design manufacturing and service with big data" The International Journal of Advanced Manifacturing Technology, vol. 94 No. 9-12, Mar. 16, 2017, pp. 3563-3567.
Heejong Park et al "Challenges in Digital Twin Development for Cyber-Physical Production Systems" Jul. 2, 2019, ROBOCUP 2008: Robot Soccer World Cup XII (Lecture Notes in Computer Science; Lect. Notes Computer) Springer International Publishment Cham, pp. 28-48.
"PNW65-761 Asset administration shell for industrial applications" PN 65/701/NP IEC, 3, Rue De Varembe, PO Box 131, CH-1211 Geneva 20, Switzerland, Aug. 16, 2019, pp. 1-59.
Benjamin Korth et al "Simulation ready digital twin for realtime management of logistics systems" 2018 IEEE International Conference on Big Data (Big Data) IEEE Dec. 10, 2018 pp. 4194-4201.
Ashtari Talkhestani et al., "An architecture of an Intelligent Digital Twin in a Cyber-Physical Production System," *at-Automatisierungstechnik*, 67(9): 762-782 (Sep. 2019).
Grangel-Gonzalez, "A Knowledge Graph Based Integration Approach for Industry 4.0," Doctoral Dissertation, *Universitäts-und Landesbibliothek Bonn*, 198 pp. (Nov. 29, 2018).
European Patent Office, Office Action in European Patent Application No. 19203395.9, 10 pp. (dated Aug. 28, 2023).
China National Intellectual Property Administration, Office Action in Chinese Patent Application No. 202011102220.7, 25 pp. (Nov. 14, 2023).

* cited by examiner

PRODUCTION LINE FOR MANUFACTURING A PART OF A VEHICLE

CROSS-REFERENCE TO PRIOR APPLICATION

Priority is claimed to European Patent Application No. EP 19 203 395.9, filed on Oct. 15, 2019, the entire disclosure of which is hereby incorporated by reference herein.

FIELD

The invention relates to the field of industrial manufacturing, i.e. to an industrial device or plant designed for manufacturing products, particularly to a production line for manufacturing products. The invention further relates to a computer-implemented method for manufacturing, a computer program product, a computer-readable storage medium, and to a use of a production line.

BACKGROUND

The production of a product, for example of a building block, by an industrial plant requires large variety of information, e.g. about the parts or components of the product, about their assembling or other treating methods, and further information. Large-scale automation systems, such as industrial plants, may rely on information about so-called "physical assets" like sensors, actuators, drives, motors, which are composed to form composite assets ranging from "small" devices—e.g. a motor, sensor, or actuator—to complex systems, for example a powertrain of a vehicle. There may also be information on so-called "soft assets" required. Such "soft assets" are, at least in some cases, available as software entities, e.g. as database records. These physical and soft assets may come from different vendors. Hence, the format and even the semantics of their information may be vendor-specific. Some chunks or assemblies of this information about the components—e.g. a list or another kind of structure—may be called "digital twins".

Therefore, it may become a complex, cumbersome, and error-prone task to gather all the information, which is required for manufacturing the product, and to produce or to get the manufactured product in a sufficient and/or pre-defined and/or desired quality.

SUMMARY

In an embodiment, the present invention provides a production line for manufacturing a building block, which comprises at least one component, the production line comprising: a central conveyor line; at least one feeding line configured to feed the at least one component to the central conveyor line; a manufacturing tool set configured to process the at least one component; and a control unit configured to control the central conveyor line, the feeding line, and/or the manufacturing tool set, wherein to control at least one of the central conveyor line, the feeding line, and/or the manufacturing tool set comprises: retrieving an asset-information about the at least one component and/or the manufacturing tool set, conveying the at least one component according to the asset-information by the feeding line to the central conveyor line, retrieving a processing-information and/or a manufacturing tool set information about processing the at least one component, and processing the at least one component by the manufacturing tool set according to the processing-information and/or the manufacturing tool set information.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
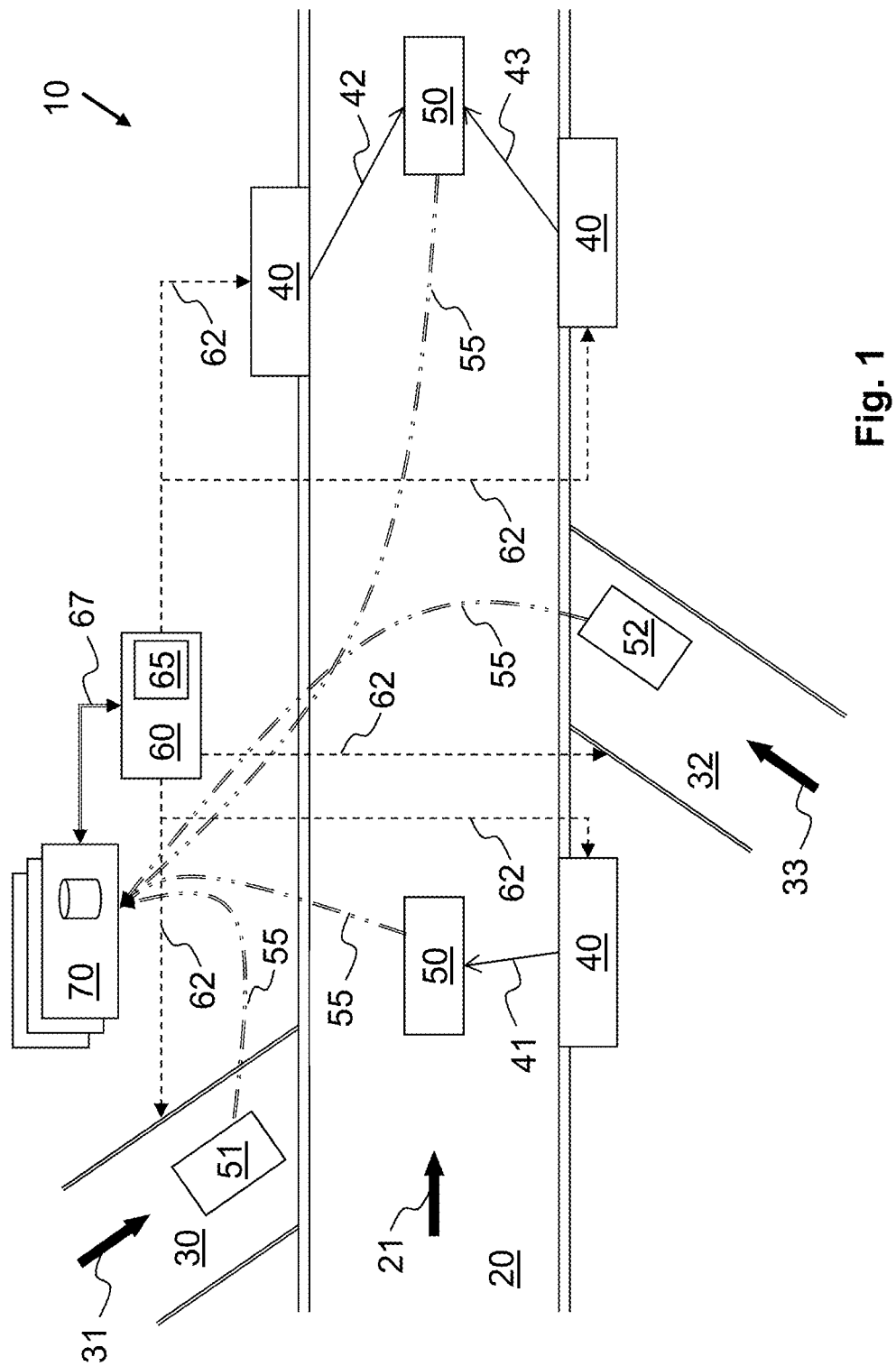
FIG. 1 schematically shows a production line according to an embodiment.

In an embodiment, the present invention contributes to an improvement of the manufacturing process.

One aspect relates to a production line for manufacturing a building block. The production line comprises:
  a central conveyor line,
  at least one feeding line, for feeding a component to the central conveyor line,
  a manufacturing tool set, configured for processing the component, and
  a control unit, configured to control the central conveyor line, the feeding line, and/or the manufacturing tool set.

To control at least one of the central conveyor line, the feeding line, and/or the manufacturing tool set comprises to:
  retrieve an asset-information about the component and/or the manufacturing tool set (40),
  convey the component according to the asset-information, by the feeding line, to the central conveyor line,
  retrieve a processing-information and/or a manufacturing tool set information about processing the component, and
  process the component, by the manufacturing tool set, according to the asset-information and/or the processing-information and/or the manufacturing tool set information.

The production line may be an entity ranging from a (quite small) industrial production or manufacturing device to a (quite big) plant or a large-scale automation system. The production line may be designed for manufacturing a product and/or a system. The production line may be fully or partly automated. The product to be manufactured may range from "small" devices—e.g. a motor, sensor, or actuator—to complex systems, for example a powertrain of a vehicle. The manufacturing may comprise a simple treatment of a single product, e.g. polishing the surface of a housing, to assembling and/or interconnecting and/or processing, working etc. a product, and/or a combination of all manufacturing steps like these.

The central conveyor line may be or may comprise, for instance, a conveyor belt, which carries the product to be manufactured through one or more steps of the production, thus stepwise adding more parts or components to the product and/or working or treating the product, i.e. the intermediate product or the end-product, in a specified or predefined way. The central conveyor line may be or may comprise an arrangement of robotic components for treating, assembling, etc. the product in a specified way.

The at least one feeding line is designed for feeding one or more components to the central conveyor line. The design of the feeding line may depend on the central conveyor line. For instance, if the central conveyor line comprises a conveyor belt, the feeding line may look as a belt. In robotic environments, the feeding line(s) may look like a part of the central conveyor line.

The manufacturing tool set is configured for processing the component. The processing may comprise working or treating the product, and/or may include assembling and/or interconnecting the product. Accordingly, the manufacturing tool set may be or may comprise, for instance, a machine for drilling, polishing, milling, and/or a combination of these. The manufacturing tool set may be or may comprise, for instance, a machine for gluing, welding, screwing, and/or other connection techniques.

The control unit is configured to control at least one of: the central conveyor line, the feeding line, and/or the manufacturing tool set. The control unit may comprise one or more controllers or processors and/or other types of computing devices, such as a data bases, apparatuses for outputting and/or inputting information, communication apparatuses, and/or others.

To control the production line and/or parts of it—i.e. at least one of the central conveyor line, the feeding line, and/or the manufacturing tool set—comprises to retrieve a so-called asset-information about the component and/or each of the components to be assembled and/or treated.

The asset-information may comprise any kind of description of a physical asset, for instance of a physical asset, which may become part of the product and/or the manufacturing tool set, which may be configured to work and/or assemble the product and/or its intermediate steps or stages. Examples may comprise information on its type, its dimensions, its material, surface, colour, connections, and/or others. Examples may comprise asset-specifics: The asset-information of a motor may comprise its performance, voltage to be run, torque, electric connections, and so on.

To retrieve the asset-information of the component may comprise to get and/or to gather information on this component from one or more databases. This may include one or more transformation steps to transform the component's information and/or information parts into a format suitable for the control unit of the production line and/or of parts of the production line. The format of the component, which is suitable for the control unit, and/or the asset-information about the component may be called a "Digital Twin Description" of this component.

The asset-information and/or the digital twins may be structured in a hierarchical way. To provide a simple example of such a hierarchical structure: A part of a powertrain may comprise a throttle-control actuator, a pedal sensor, and a controller. The throttle-control actuator may comprise an electric motor and a moveable throttle. The electric motor may be specified (among others) by its geometry, its power, its voltage, and its working-angle. The controller may be specified (among others) by its controller-type, and by a type and a version of the software to control this part of the powertrain. More examples are provided below.

The retrieving may include automatically integrating digital twins in a recursive way into composite digital twins, e.g. by transforming them in a suitable format. The digital twins (and/or preliminary or "raw" stages of digital twins) may be provided by different vendors. Hence, the transforming may include a format-transformation (e.g. from an output of a CAD-tool to an XML-based representation). The transforming may include an error-check, e.g. for consistency of the data provided and/or for lacking information. The retrieving, particularly the hierarchical way of the retrieving, may include to get rid of errors (or at least reduce those) in the production line and/or in parts of production line during manufacturing, e.g. by avoiding the assembling of inappropriate components. Furthermore, errors in the manufactured product may be reduced, possibly caused by an older version of a controller's software, or a too weak electric motor in another part.

The asset-information may be used to integrate parts of the production line as part of a system. This may also be done during the bidding or in the bidding process, during engineering, initial commissioning or also during a later change of the system. During this integration of components, the virtual representation of the components ("digital-twin") may be constructed based on the asset-information of the components. Information with the asset-information can be used e.g. to determine data-flows required for the interaction between components or to configure the interaction between components. The proposed concept is resulting in the integration of digital-twins in the virtual world affecting the integration of the components in the physical world. A virtual representation of the system may be constructed based on the asset-information of each component. The virtual representation of the system may be used, e.g., to control the resulting system and evaluate data gathered from each component on a system level—e.g. for a so-called "health monitoring" of the system. The asset-information of each component may also comprise information about the disintegration—i.e. how the component can be removed safely from the system.

To control the production line (and/or parts of it) further comprises to convey the component according to the asset-information, by the feeding line, to the central conveyor line. The conveying may comprise to find the storage of the component, which corresponds to the asset-information. The conveying may comprise an error-message and/or an ordering-message in cases when the component is not available.

To control the production line (and/or parts of it) further comprises to retrieve a processing-information and/or a manufacturing tool set information about processing the component. The processing-information and/or the manufacturing tool set information may comprise treating information about the component and/or assembling information with other components. The processing-information and/or the manufacturing tool set information may be structured in a hierarchical way. This may lead to analogue steps, treating and/or advantages as described for the hierarchical composing of asset-information.

To control the production line (and/or parts of it) further comprises to process the component, by the manufacturing tool set, according to the asset-information, the processing-information and/or the manufacturing tool set information. The processing may comprise an error-check, e.g. for inappropriate processing or about the state of the manufacturing tool set. Advantageously, both the fitting of the components and the processing of the product, i.e. of the intermediate product(s) and/or the end-product, may be checked before processing the (real) component by building-up the respective digital twin(s) of the end-product. As a result, time and effort required both for preparing the manufacturing and for creating (e.g. composite and/or hierarchical) digital twins with structures of value for operation, monitoring, data analytics, or maintenance may be significantly reduced. The systematic approach, as described here, may also allow faster change management and improved quality of the product. Manual work may be reduced significantly, for instance to a verification of the composed digital twins.

In various embodiments, the asset-information about the component and/or the manufacturing tool set comprises a type of the component, the manufacturing tool set, and a model of the component, comprising at least one attribute. Examples for a type may be a system, a physical device, a software entity, and other kind of types. There may substructures be given for the type, e.g. a motor, sensor, etc., as a sub-structure for the physical device, or a controller-software, possibly including a version, as a sub-structure for the software entity.

Examples for the model may comprise a functional model, e.g. describing electric properties and/or attributes, a CAD drawing, e.g. describing mechanical and/or geometric attributes, other kind of models, and/or a combination of them. Consequently, the digital twins may be constructed, e.g., for soft assets, for composite assets, and further types. Note that this may include "tags", which may be useful to compare aspects of different objects or types, and further to establish relations among multiple digital twins; see below. The models may advantageously serve as a basis for a simulation of the product and/or parts of it, for instance to prepare for the production process and/or aspects of it.

In some embodiments, the asset-information further comprises a lifecycle of the component and/or of the manufacturing tool set. This may be useful for considering environmental issues, e.g. aspects of treating and/or assembling the component(s), hints for getting rid of the component(s), possibly including disassembling instructions, and/or further aspects.

In various embodiments, retrieving the asset-information comprises to search for a raw asset-information about the component and/or about the manufacturing tool set in each database from a list of databases. Since specifications and/or other data may be spread among several databases, possibly even among several databases of several companies, there may be a need to check many databases, particularly a list of databases, for the component(s) in question, e.g. physical assets, soft assets, and/or systems (which includes subsystems). The list of databases may be structured and/or the list may carry further properties, for instance: database(s) of preferred component supplier, allowed supplier, back-up supplier, database(s) for backing and/or additional and/or cross-check information, etc. At least some of the suppliers may not have a suitable format and/or insufficient information about the component(s) in question. Some components may be not deliverable, e.g. temporarily not deliverable.

If no raw asset-information about the component is available in any database from the list of databases, a warning is output. The raw asset-information may be of a different format and/or may have different information than the asset-information. In a variation, a further warning is output, if the raw asset-information is not available in a predefined subset of databases, e.g. in databases of the preferred component supplier. Example of the warning may comprise a message like "no link", "construction/destruction not feasible". In at least some cases, auxiliary information, such as network availability of the devices or components or topological information, may be considered. Topological information may comprise network-topology, for example to determine if the device is connected to the same network and, thus, a communication and/or integration is possible or not. Topological information may comprise location-topology, i.e. to determine if both devices are located in a way that they can physically interact, if required. Topological information may comprise functional-topology, i.e. to determine if a device is a sub-device of another. In some cases, the warning may include and/or lead to further actions, e.g. to re-consider the list of suppliers, to re-consider the component(s) and/or to alternate the requirements of the component(s).

If the raw asset-information about the component is available in a database from the list of databases, the raw asset-information about the component is transformed into the asset-information. The asset-information may be described, e.g., in a so-called "Digital Twin Description Language". By this, asset-information about the component is built up and/or generated, possibly generated automatically and/or built up, at least partly, manually. The manual building up of a digital twin may in some cases be done for in-house devices. As a further advantage, this proceeding may tackle the so-called "information silo problem" among multiple "atomic" physical and/or soft assets in a production system: each asset that exists in a production system has a set of information around it. For example, a drive powertrain may comprise drives, motors, transformers, and pumps. Each of the drives may have a firmware, which contains the operational parameters of the connected motor. Some kinds of motors may have smart sensors connected to them. Scattered information in a system across multiple "information silos" (e.g. an "insular" information management system) makes it very time-consuming and error-prone to find the relevant information about any physical/soft asset. Also, it hinders efficient development of more advanced applications such as system-wide analytics and/or system-wide real-time simulations for the production systems, because these applications need information aggregated from multiple sources. This proceeding may at least reduce issues related to this.

In some embodiments, the retrieving of the asset-information further comprises to check each database from the list of databases, regularly or event-driven, for a new and/or a changed raw asset-information about the component and/or a change in the manufacturing tool set. The list of databases may be subject to change, e.g. may be expanded and/or reduced. A regular check may be performed, e.g., every hour, day, week, or in shorter or longer intervals. The intervals may depend on the type of component. The event-driven check may comprise the monitoring of external events, e.g. creating or destructing a model in a database. This may, e.g., be triggered by a life-insertion of a component. The respective database may send messages and/or other signals in case of changes.

In various embodiments, the processing-information comprises the asset-information about the component (or components) to be processed, and a processing-technique to process the component(s).

The processing-information about one component may comprise, e.g., to drill a hole, to polish a surface of the component and/or other techniques.

The processing-technique may comprise to define different relations among the digital twins. For example, a "ConnectedTo" relation may define which digital twins are connected to each other and impact each other lifecycle and/or models. An "InstanceOf" relation may define a relationship between a physical device and its product type. A "ConsistsOf" relation may define the relation between a composite digital twin and its constituents. Users may extend DTDL with further and/or new relations types.

In some embodiments, the processing-technique comprises to drill, to mill, to turn, and/or to polish the component, and/or to connect at least two components by a substance-to-substance bond, a form-locked connection, and/or a frictional connection.

In various embodiments, retrieving the processing-information comprises to search for a raw processing-information about the component, or the components, in each database from the list of databases. The strategies to achieve this may be similar to the strategies of retrieving the asset-information. The processing-information may be designed to consider structural relations between the components and/or their digital twins. Thus, an automatic construction of structural relations among atomic digital twins to construct composite digital twins for systems: atomic assets are logically or physically related/connected to each other. For example, a motor in a powertrain may be is physically connected to a drive. A drive may be logically connected to its product type.

If no raw processing-information about the component is available in any database from the list of databases, a warning is output.

If the raw processing-information about the component is available in a database among the list of databases, the retrieving comprises to transform the raw processing-information about the component, which is available in the database, into the processing-information. An additional effect may be to build up and/or generate processing-information about the component.

In various embodiments, retrieving the processing-information further comprises to retrieve a semantic relation between a first attribute of the asset-information and a second attribute of the asset-information, wherein the semantic relation between the first and the second attribute of the asset-information may comprise a function and/or an ontological relation. The function may be a mathematical (e.g. a logical) function, and/or may express physical relationship (e.g. between current and torque of a motor). Semantic relations may be information pieces within one digital twin can related to the information pieces in other digital twins even if the information have different name and syntax. As example of a function, the frequency signal from a drive is related to the synchronous speed of the motor it controls, given by a formula $f=(p*s)/120$, where f is the frequency of electric supply in Hz, p is the number of poles in the motor, and is the motor synchronous speed in rpm. Further examples of semantic relations may be the kind of underlying asset, the relations among the assets, the semantics of assets, and/or relations among the assets. The semantic relations may bring further benefits for error-checks of the assets. If, for instance, an electric motor, which is destined for a product to be manufactured, has two version, which mechanically fit to each other, but not electrically or electronically. Checking their semantic relations may be a strategy to find out such inconsistencies or non-fitting.

In various embodiments, retrieving the processing-information further comprises to output a warning, if the function is not defined or invalid. This advantageously may help to find out errors and/or inconsistencies in an early stage of manufacturing or in even early stages, e.g. in planning.

A further aspect relates to a computer-implemented method for manufacturing a building block in a production line. The method comprises the steps of:
retrieving an asset-information about a component and/or a manufacturing tool set,
conveying the component according to the asset-information, by the feeding line, to the central conveyor line,
retrieving a processing-information and/or a manufacturing tool set information about processing the component, and
processing the component according to the processing-information and/or the manufacturing tool set information.

The component may also be called an asset, particularly a "physical asset", a "soft asset", and/or a "system" (which includes, possibly in a recursive and/or hierarchical way, sub-systems). This method advantageously helps to generate and/or integrate assets—and/or so-called "digital twins" of these assets—that are required for manufacturing a building block in a production line. The generating and/or integrating may be based on the semantic-based information of these assets. This may include to monitor external events, e.g. the creating or destructing of a model of an asset, and/or to keep the assets up to date. This may be achieved by checking internal databases (i.e. of the same company) and/or external databases (i.e. of the other companies, particularly of suppliers).

In some embodiments, the processing-technique comprises: to drill, to mill, to turn, and/or to polish the component, and/or to connect at least two components by a substance-to-substance bond, a form-locked connection, and/or a frictional connection. Note that these are just non-exhaustive examples of processing-techniques.

A further aspect relates to a computer program product comprising instructions, which, when the program is executed by a control unit and/or one or more processors, cause the control unit to carry out the method as described above and/or below.

A further aspect relates to a computer-readable storage medium where a computer program as described above is stored on.

A further aspect relates to a use of a production line as described above and/or below or a method as described above and/or below for manufacturing a vehicle or a part of a vehicle.

The reference symbols used in the drawings, and their meanings, are listed in summary form in the list of reference symbols. In principle, identical parts are provided with the same reference symbols in the figures.

FIG. 1 schematically shows a production line 10 according to an embodiment. The Production Line 10 comprises a central conveyor line 20, which is designed as a conveyor belt. However, the central conveyor line 20 may also be designed quite differently, for example as a field of robotic devices. The central conveyor line 20 moves in a direction of arrow 21. Feeding line 30 and 32 move in a direction of arrow 31 or 33, respectively. These feeding line 30, 32 are also designed as conveyor belts, which move towards the central conveyor line 20, thus carrying components 51 and 52 to the central conveyor line 20. Components 50, possibly coming from feeding line 30, 32 or from other directions, are already sited on the central conveyor line 20. The production line 10 further comprises three manufacturing tool sets 40, which are configured for processing the components 50, 51, 52. The manufacturing tool sets 40 are sited at the sites of the central conveyor line 20. One manufacturing tool set 40 is processing 41 component 50, two further manufacturing tool sets 40 are processing 42, 43 the component 50. The different kind of processing 41, 42, 43 may depend on the production line 10 and/or the building block to be manufactured on production line 10. The production line 10 further comprises a control unit 60, with a memory 65. The control unit 60 is configured to control the central conveyor line 20, the feeding line 30, 32, and/or the manufacturing tool set 40, by means of controlling lines 62. The controlling lines 62 may be wires or wireless connections. The control unit 60 is connected to several databases 70, via interface 67. The databases 70 may comprise internal and/or external databases.

To control at least one of the central conveyor line 20, the feeding line 30, 32, and/or the manufacturing tool set 40 comprises to retrieve an asset-information about the component 50, 51, 52. This may include one or more accesses to databases 70, in order to get raw asset-information about each of the component 50, 51, 52 in each database 70, selected, e.g., from a list of databases, which is available (and/or updated) in the memory 65 of the control unit 60. The retrieving may further include transforming the raw asset-information about each of the components 50, 51, 52 into the asset-information. In at least some embodiments, operational data from the components 50, 51, 52 may be fed back into at least one of the databases 70 (see arrows 55) and/or to memory 65. This may add lifecycle data or lifecycle information to the description and/or digital twin of the respective component(s) 50, 51, 52 and/or the product. This advantageously contributes to a tracking of all relevant phases of said component(s) 50, 51, 52 and/or the product. This may, in some embodiments, contribute to a "complete lifecycle information chain", i.e. (e.g.) from bidding to engineering to commissioning to operations.

To control said devices further comprises to convey the component 50, 51, 52 according to the asset-information. In the example shown, this is realized by the feeding lines 30, 32, which carry the components 50, 51 to the central conveyor line 20. Dependent on the design of the production line 10, other mechanisms may be used to bring the components 50, 51, 52 to the respective manufacturing tool set 40.

To control said devices further comprises to retrieve a processing-information about processing the component 50, 51, 52. The processing-information may comprise information to work one single component and/or information to assemble two or more components.

To control said devices further comprises to process the component 50, 51, 52, by the manufacturing tool set 40, according to the asset-information and/or the processing-information. This contributes to perform the machining of the component, the intermediate product and/or the end-product.

Figure 2:
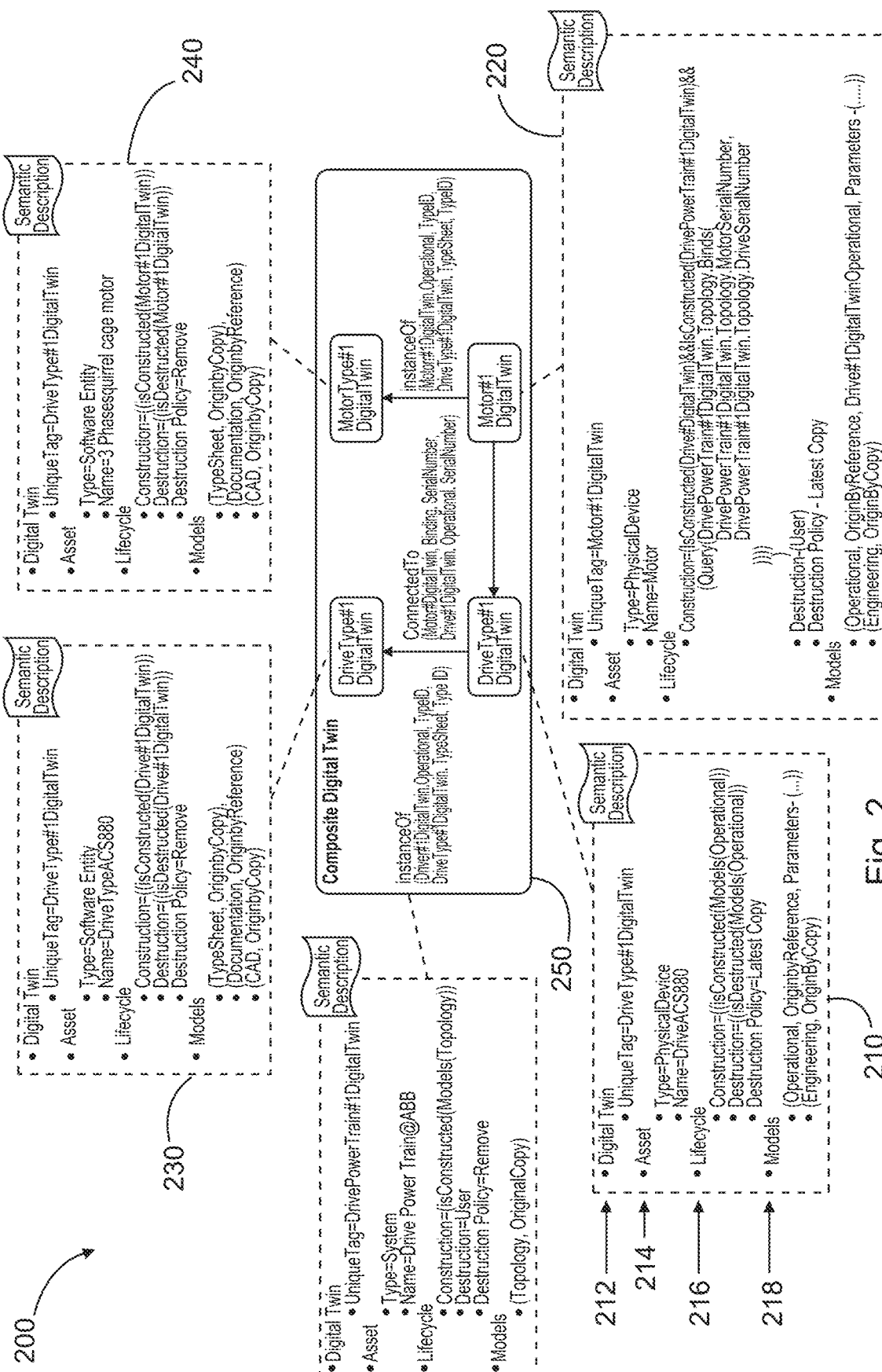
FIG. 2 schematically shows an example of a description language for describing an asset according to an embodiment.

FIG. 2 schematically shows an example of a description language for describing an asset 200 according to an embodiment. The asset may be a system or sub-system. In some embodiments, the description language is called "Digital Twin Description Language (DTDL)". In the example shown, four assets are described: a drive 210, a motor 220, a drive type 230, and a motor type 240. The drive 210 and the motor 220 are examples for "physical assets", the drive type 230 and the motor type 240 are examples for "soft assets". These assets may be (exemplary) parts of a "system asset" powertrain 250 (in the middle of the figure). Thus, these descriptions may result in an automatic construction of a "digital twin" of a powertrain, which is to be manufactured by a production line, e.g. by the exemplary production line 10 of FIG. 1.

The digital twin description may provide a declarative definition of at least following information about a digital twin, for example of the drive 210: A unique tag 212 of the digital twin; this is for an identification of each digital twin. Further, a kind of the asset 214, i.e. "soft asset" or "physical asset", and a human-readable name of the asset, e.g. "Drive ACS 880". Models of the component described this way may be connected to (or contained in) each digital twin of the component. Additionally, a so-called lifecycle information 216 of the digital twin. The lifecycle information 216 may comprise a condition under which the digital twin is constructed and/or destructed, and an "effect" of the destruction on the content of the digital twin. The "effect" may comprise a destruction of a component and/or an activation of a component, e.g. as a replacement, for instance by evaluating the digital twins of the components to determine which component(s) can deliver the required functionality. In a production line, the effect of a component destruction may also comprise a rerouting of the assembled product to an alternative manufacturing tool, e.g. after a shut-down of a first tool. The lifecycle information 216 may include a description of a construction and/or destruction of relations; relations are depicted as solid edges in FIG. 2. The use of the description language DTDL may contribute or may be a precondition for defining complex queries on the available information and/or models 218. Models 218 may comprise a Topology-Model, which may be used, e.g., for considering aspects like physical and/or logical placement and/or relationships of the related component. Furthermore, an Operational-Model may describe the provided functionality and/or may provide an interface for interacting with the device. In addition, an Engineering-Model may describe the configuration of a device and may also provide means to re-configure the device. Further, this may define a lifecycle semantic of digital twins. The information of other digital twins, e.g. the motor 220, may look similar and/or may depend on the function or other properties or attributes of the component.

More concrete, in the example shown: The digital twin of the drive 210 is constructed when its operational model is constructed. This may be achieved by the following mechanism: When, for instance, the drive 210 is plugged into the network—possibly by means of a life-insertion mechanism —, a digital twin of the drive 210 is created, by means of a semantic-based information. Likewise, when the Operational model is destructed—e.g., when the drive is unplugged from the network —, its digital twin may be destructed, by means of a semantic-based information. Various strategies may be taken for destruction: e.g., removing the digital twin from the memory 65 of the control unit 60, or marking it, in the memory 65, as deactivated and keeping its latest values. Keeping it may be advantageous for further analysis. In the example shown, the digital twin of the drive contains an "Operational Model", which references drive parameters, and an "Engineering Model", which keeps a copy of the engineering model. The references in the Operational Model may be used to refer to the physical device and/or to request its live values. A copy of parameters, as used in the Engineering Model, may be used as a backup of the configuration, which may be modified in the digital twin in order to reconfigure the related device.

A digital twin of the motor 220 may be constructed when the digital twin of the drive 210 and the "system" powertrain 250 are already available. In addition, the digital twin of the motor 220 may be connected to the digital twin of the drive 210, to which (in this example) the motor 220 is physically connected. This is expressed here in the form of a query on the "Topology Model" of the digital twin of the powertrain 250. The digital twin of the motor 220 may contain operational parameters of the motor, which are collected from within the digital twin of the connected drive.

A digital twin of the drive type 230 may be automatically constructed or destructed, when the digital twin of the corresponding drive is constructed or destructed, respectively. For the digital twin of the motor type 240 may apply the same strategy.

Summarized, DTDL may enable to classify a group of correlated digital twins as a composite digital twin. For example, a specific drive 210, motor 220, and their "types" 230 and 240 can be grouped as one specific powertrain 250, which is to be manufactured in a certain production line or plant. The composite digital twin can similar to atomic digital twin have its own models. In our example, the composite digital twin of the powertrain 250 is constructed, when the Topology Model is available, which contains information on which motor 220 is physically connected to which drive 210.

Furthermore, DTDL allows to define different relations among the digital twins. Example may comprise a "ConnectedTo" relation, which defines which digital twins are connected to each other and impact each other lifecycle/models. Further, an "InstanceOf" relation, which defines a relationship between a physical device and its product type. Further, a "ConsistsOf" relation, which defines a relation between a composite digital twin and its constituents. DTDL may be extended with further relations types, which define a further relation among the digital twins.

Devices shipped by different vendors may have vendor-specific digital twins. For this case, DTDL enables defining proxies for such digital twins. The proxies may be simple links to the digital twins end points, such as their URL or URI, or based on an automatic generation of a mapping between digital twin formats.

Digital twin definitions in DTDL may be based on concrete device types, IDs, parameter names, etc. Alternatively, the assets and their information may be defined in as more abstract way, e.g. by using some semantics information. For example, a concrete type of a motor or a description of a family of motors that may be used interchangeably. The semantics may be defined using various dictionaries or ontologies, such as eCl@ss, CDD, proprietary OWL descriptions, etc.

Furthermore, a single digital twin may be populated with different models (copy or reference), and relations among these models may be established within that digital twin.

An example scenario for constructing or destructing a digital twin may look as follows: A user plugs a drive into the network. There is a model provider, which detects this and informs the monitor component that the operational model of the drive is available. This component sends this event to the Lifecycle Manager component, which checks the related Digital Twin Description (see, e.g., FIG. 2), and infers that a digital twin for the drive can be constructed upon the availability of the operational model. Then this digital twin is constructed by the Lifecycle Management component and the operational model is added to it. The check may continue, and the digital twin of drive type is also constructed afterwards because its construction condition is fulfilled. At some point in time, another Model Provider feeds a Topology model, which contains information about which motor is connected to which motor. The availability of this model results in the construction of the composite digital twin for the powertrain. At this stage, the construction condition of the motor digital twin is also fulfilled, because Lifecycle Manager component can use the information provided by the Topology model to infer which motor is connected to which drive. Accordingly, the digital twins of the motor and its type are constructed. Upon availability of each model and after construction of relevant digital twins, the Model Manager component, checks how the content of the model should be included in the digital twin. For example, when the digital twin of the motor is constructed, Model Manager creates an operational model for it by referencing to specified parameters within the operational model of the drive digital twin.

Figure 3:
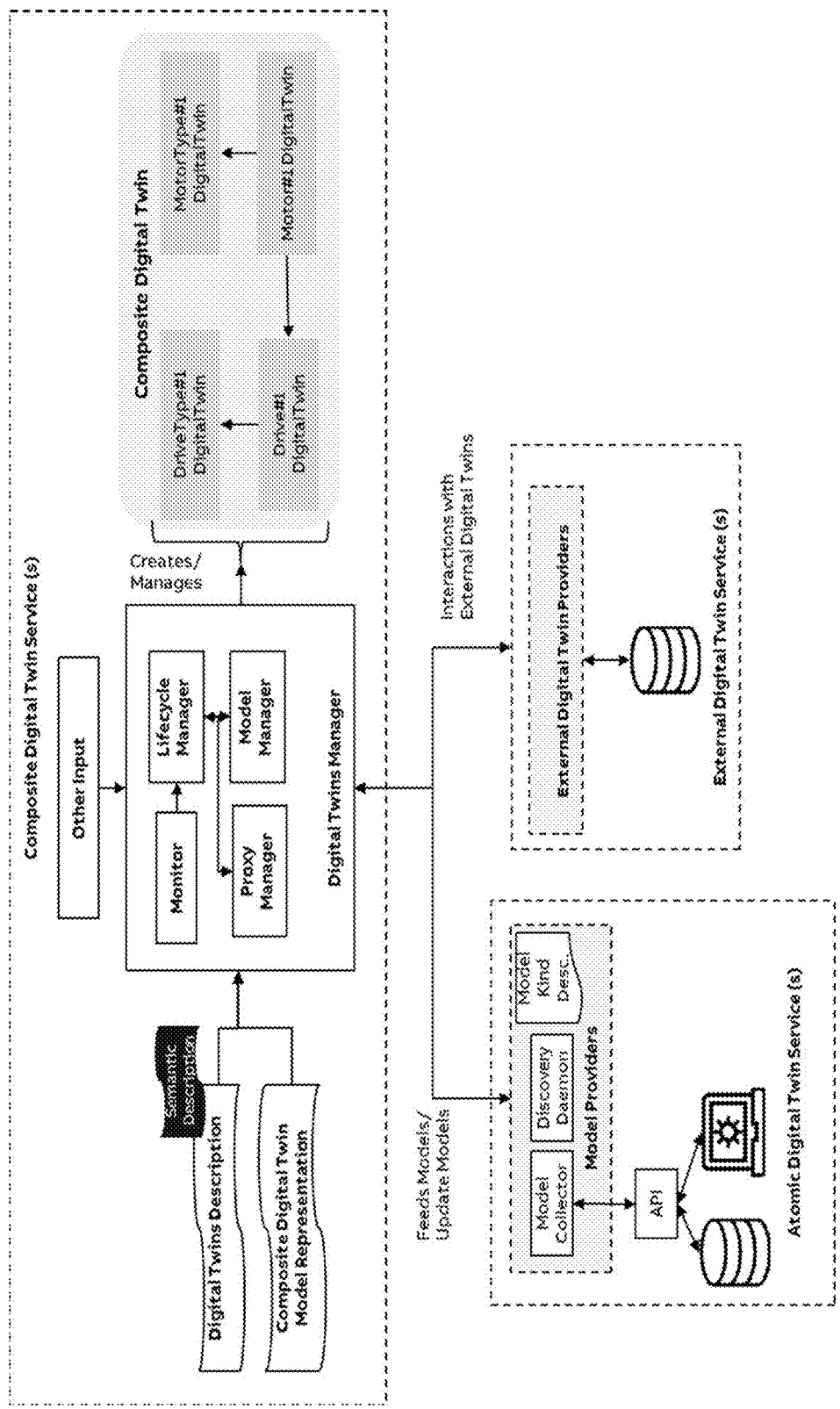
FIG. 3 schematically shows a further example of a description language for describing a production line with several assets according to an embodiment.
Figure 4:
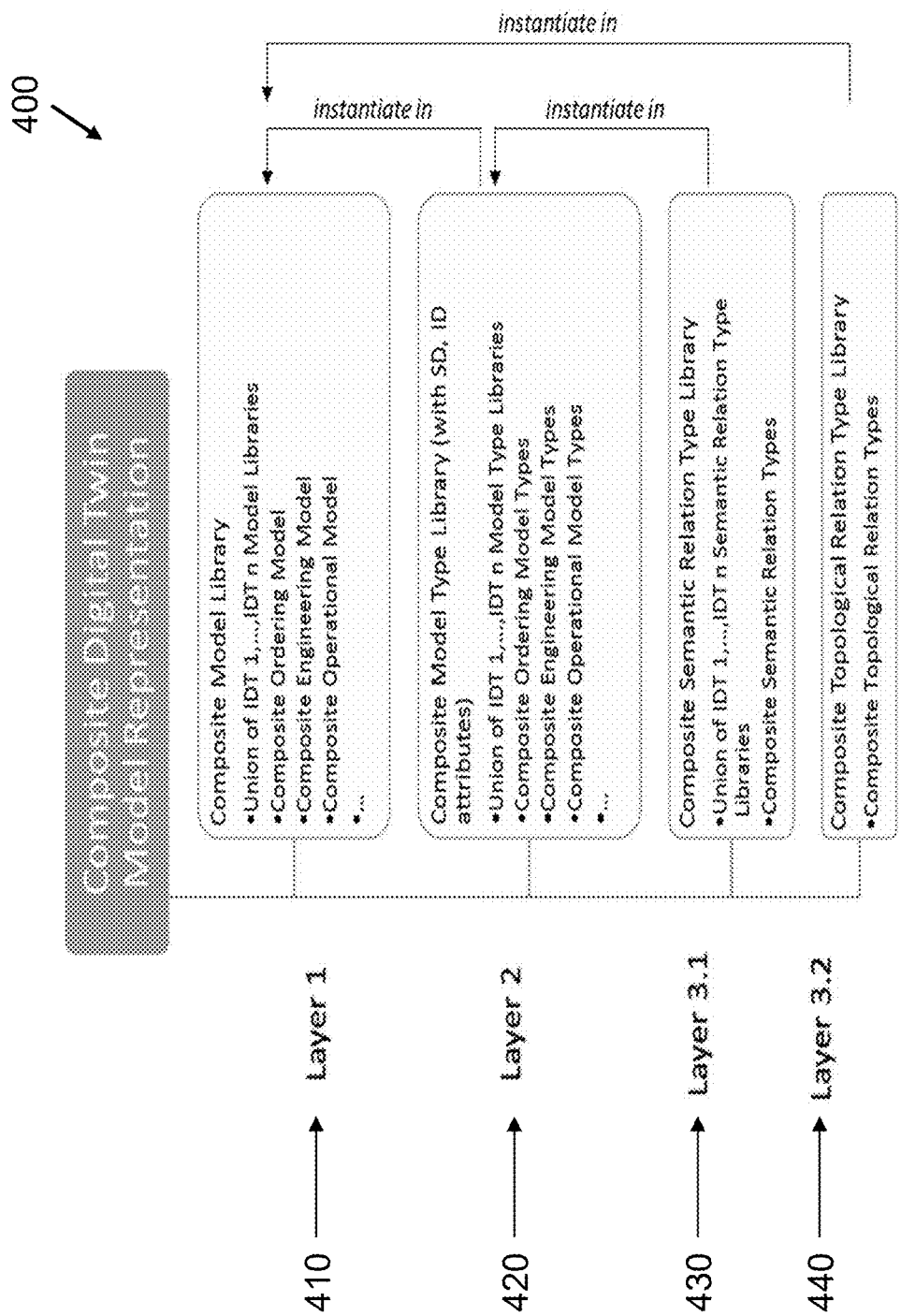
FIG. 4 schematically shows an example of a description language for describing an asset with multiple layers of a model representation according to an embodiment.

FIG. 3 schematically shows a further example for the software architecture, which may be used within the control unit 60 to handle the digital twins; cf. the right hand side of FIG. 3 and the corresponding middle part of FIG. 2. Furthermore, it may be used to process and/or to evaluate the DTDL documents, as, e.g., indicated by reference signs 230, 240, 210, and 220 in FIG. 2. The DTDL documents correspond to "Digital Twins Description" in FIG. 3 and Layer 1 in FIG. 4. "Composite Digital Twin Model Representation" may contain data from Layers 2 and 3 of FIG. 4. The main Software Component called "Digital Twins Manager" may use its Monitor sub-component to continuously monitor the data from Atomic Digital Twin Services, which are interfaces to databases 70 and may be extended by access mechanisms, e.g. discovery or additional business logic, and also by "External Digital Twin Services", i.e., for example, accessing component information provided by some external part-supplier). The monitoring procedure may cover the available models from atomic digital twins and their content and may compare them to the DTDL description. On a successful matching of a DTDL condition with newly available data within atomic digital twins—e.g., a discovery of a new component which kind matches the DTLD description —, an update of a composite digital twin model may be triggered by the Lifecycle Manager. A "Model Manager" may handle how the content of the model should be included in the digital twin upon its construction, e.g. by copying over the values or setting up references. A "Proxy Manager" may be responsible for establishing local information proxies in case digital twins are provided by external services, e.g. in handles questions of how to proceed in case of an external service breakdown. Besides reactions on updates of the structure and the content of atomic digital twin services and external digital twins, the Digital Twin Manager may additionally react on other inputs, e.g. on HMI (Human Machine Interface) interactions from end-users such as a manual override of some asset properties. FIG. 4 schematically shows an example of a description language for describing an asset with multiple layers of a model representation 400 according to an embodiment. The layers shown here comprise:

Layer 1: Composite Model Library. This layer contains a union of each of the component IDT Model Libraries, and composite-level model elements, their attributes, and their values related to the composite system, e.g. power drive system 456 engineering model's "Power Drive Efficiency" element together with its value "85%". As for the IDT Model Representation, within AutomationML the model elements of the layer can be represented as Internal Elements within an Instance Hierarchy; Internal Element Attributes with accompanying fields of "Value", "Unit", "Data type" can be used to store model element attributes and their values. The elements would be instantiated using the model element types of Layer 2 (and thereby indirectly inherit any associated semantic relation types of Layer 3.1) as well as topological relation types of Layer 3.2 to represent the physical connections between the components; this can be done in AutomationML as the format allows multiple inheritance.

Layer 2: Composite Model Type Library. The types contained in each of the component IDT Model Type Libraries together with any composite-level type information such as semantic descriptions and associated attributes can be stored in the second layer. Also, semantic relations among the element types would be directly inherited in this layer. Similar to the IDT Model Type Library representation in AutomationML, the element types here can be stored as System Unit Classes, their semantic descriptions can be provided using the class Description field or instantiated from Role Classes, while semantic relations between element types can be instantiated from Interface Classes.

Layer 3.1: Composite Semantic Relation Type Library. All semantic relations from the IDT Semantic Relation Type Libraries together with composite-level semantic relations between types in Layer 2 can be stored in this layer. Within AutomationML these semantic relations can be stored as Interface Classes within Interface Class Libraries.

Layer 3.2: Composite Topological Relation Type Library. All physical connections between the component IDTs can be abstracted for storage as topological relation types in this layer. These can also be represented using Interface Classes in AutomationML.

As in the case of IDTs, the type libraries of Layers 2 and 3 of the CDT may also grow through usage and expert inputs, creating an expanding knowledge base which can be applied to subsequent instances of the composite type as well as to other overlapping composite types, e.g. power drive system CDT Model Element Representation could be reused as a subset of a power drive system with a conveyer belt CDT. The usage of libraries is targeting the derivation and reuse of common types. Common types may be useful to omit or reduce the manual effort, which would be required if all devices made use of different, untyped or proprietary models. In cases where common types are not readily available—e.g. due to differences in data models —, they may be derived, for instance, by a common agreement. Further, common types may contribute to a common handling and, thus, an automated integration of components.

Figure 5:
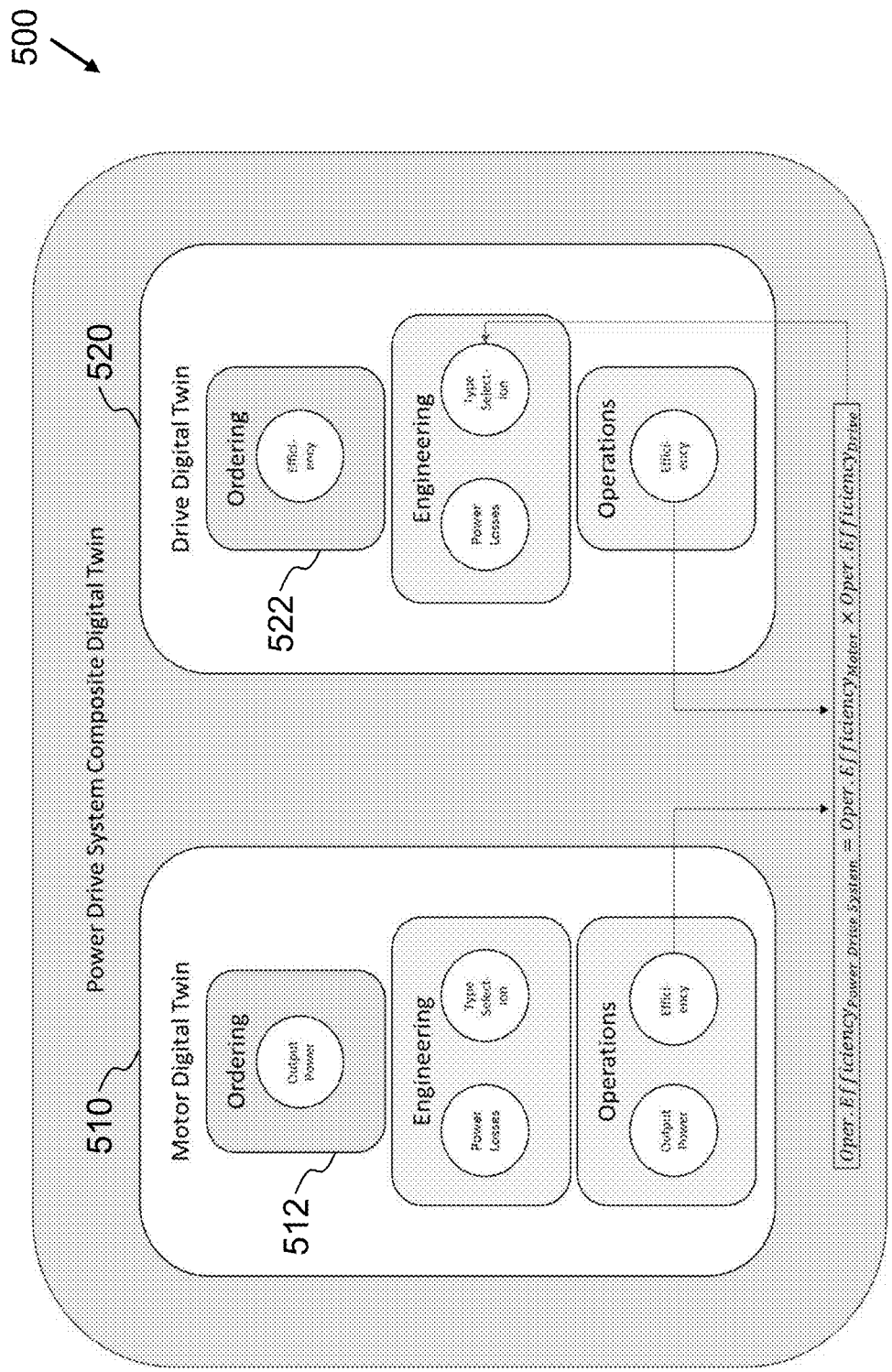
FIG. 5 schematically shows an example of a semantic relation according to an embodiment.

FIG. 5 schematically shows an example 500 of a semantic relation according to an embodiment. The example shown depicts a Power Drive System CDT formed from a Motor Digital Twin 510 and a Drive Digital Twin 520. An example submodel of the CDT would be Motor.Ordering 512 and Drive.Ordering 522. An example of a (composite-level) semantic relation type instantiated in Layer 2 is:

$$\text{Oper.Efficiency}_{Power\ Drive\ System} = \text{Oper.Efficiency}_{Motor} \times \text{Oper.Efficiency}_{Drive}$$

Figure 6:
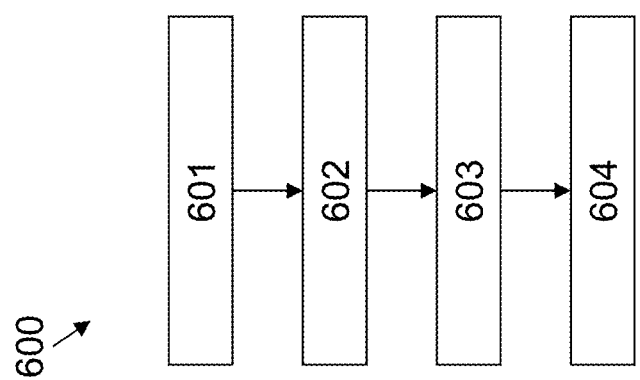
FIG. 6 shows a flow diagram of a method according to an embodiment.

FIG. 6 shows a flow diagram 600 of a computer-implemented method for manufacturing a building block in a production line 10 (see FIG. 1) according to an embodiment. In a step 601, an asset-information about a component is retrieved. The component 50, 51, and/or 52 may be a part of the building block to be manufactured. The asset-information may comprise any kind of description of a physical asset. Examples may comprise information on its type, its dimensions, its material, surface, colour, connections. To retrieve the asset-information of the component may comprise to get and/or to gather information on this component from one or more databases. This may include one or more transformation steps to transform the component's information and/or information parts into a format suitable for the control unit of the production line and/or parts of the production line. In a step 602, the component 50, 51, and/or 52 is conveyed to a central conveyor line 20, according to the asset-information. The conveying may be done by a feeding line 30 and/or 32. In a step 603, a processing-information about processing the component 50, 51, and/or 52 is retrieved. The processing-information may comprise treating information about the component and/or assembling information with other components. In a step 604, the component 50, 51, and/or 52 is processed according to the processing-information. The processing may comprise a processing-technique, such as to drill, to mill, to turn, and/or to polish the component 50, 51, 52, and/or to connect at least two components 50, 51, 52 by a substance-to-substance bond, a form-locked connection, and/or a frictional connection.

Preferably, the functional modules and/or the configuration mechanisms are implemented as programmed software modules or procedures, respectively; however, one skilled in the art will understand that the functional modules and/or the configuration mechanisms can be implemented fully or partially in hardware.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 10 production line
20 conveyor line
21 arrow
30 feeding line
31 arrow
32 and/and/or
40 tool set
41, 42 processing
50, 51, 52 components
55 feedback arrows
60 control unit
62 controlling lines
65 memory
67 interface
70 database(s)
200 asset
210 digital twin of drive
212 unique tag
214 asset
216 lifecycle information 218 models
220 digital twin of motor
230 digital twin of drive type
240 digital twin of motor type
250 "system" powertrain
400 model representation
500 example of a semantic relation
510 digital twin of motor
512 motor.ordering
520 digital twin of drive
522 drive.ordering
600 flow diagram
601-604 steps

What is claimed is:

1. A production line for manufacturing a building block, which comprises at least one component, the production line comprising:
   a central conveyor line;
   at least one feeding line configured to feed the at least one component to the central conveyor line;
   a manufacturing tool set configured to process the at least one component; and
   a control unit configured to control at least one of the central conveyor line, the feeding line, and the manufacturing tool set,
   wherein to control at least one of the central conveyor line, the feeding line, and the manufacturing tool set comprises:
   retrieving an asset-information about the at least one component and the manufacturing tool set, which comprises searching for a raw asset-information about the at least one component and the manufacturing toot set in each database from a list of databases,
   conveying the at least one component according to the asset-information by the feeding line to the central conveyor line,
   retrieving a processing-information about processing the at least one component, which comprises searching for a raw processing-information about the at least one component in each database from the list of databases, wherein retrieving the processing-information comprises retrieving a semantic relation between a first attribute of the asset-information and a second attribute of the asset-information, wherein the semantic relation between the first attribute and the second attribute of the asset-information comprises a function indicating a mathematical relationship, a physical relationship, and/or an ontological relationship, and
   processing the at least one component by the manufacturing tool set according to the processing-information,
   wherein the searching for the raw asset-information and the searching for the raw processing-information in the list of databases is designed for searching among several databases.

2. The production line according to claim 1, wherein the asset-information about the component and/or the manufacturing tool set comprises at least one of:
   a type of the at least one component,
   the manufacturing tool set, and
   a model of the component, comprising at least one attribute.

3. The production line according to claim 2, wherein the asset-information further comprises a lifecycle of the at least one component and of the manufacturing tool set.

4. The production line according to claim 1, wherein retrieving the asset-information comprises:
   if the raw asset-information about the at least one component is not available in any database from the list of databases, outputting a warning; and
   if the raw asset-information about the at least one component is available in a database from the list of databases, transforming the raw asset-information about the at least one component into the asset-information.

5. The production line according to claim 4, wherein retrieving the asset-information further comprises:
   checking each database from the list of databases, in regular intervals or based on occurrence of an event, for a new and/or a changed raw asset-information about the at least one component and/or a change in the manufacturing tool set.

6. The production line according to claim 1, wherein the processing-information comprises:
   the asset-information about the at least one component to be processed,
   the manufacturing tool set, and
   a processing-technique to process the at least one component.

7. The production line according to claim 6, wherein the processing-technique comprises:
   to drill, to mill, to turn, and/or to polish the at least one component, and/or
   to connect at least two components by a substance-to-substance bond, a form-locked connection, and/or a frictional connection.

8. The production line according to claim 1, wherein retrieving the processing-information comprises:
   if the raw processing-information about the at least one component is not available in any database from the list of databases, outputting a warning; and
   if the raw processing-information about the at least one component is available in a database from the list of databases, transforming the raw processing-information about the at least one component, which is available in the database, into the processing-information.

9. The production line according to claim 1, wherein retrieving the processing-information further comprises outputting a warning if the function is not defined or invalid.

10. A method of using the production line according to claim 1 to manufacture a vehicle or a part of a vehicle.

11. The method of using the production line according to claim 1, wherein the processing-information considers structural relationships between the at least one component and/or corresponding digital twins.

12. The method of claim 11, wherein the at least one component and the corresponding digital twin of the at least one component are used to manufacture a building block in a production line.

13. The method of claim 12, wherein the corresponding digital twin provides a declarative definition of information about the corresponding digital twin in a Digital Twin Description Language (DTDL), wherein the declarative definition of the corresponding digital twin comprises a unique tag of the corresponding digital twin, a kind of the at least one component associated with the corresponding digital twin, and a lifecycle of the corresponding digital twin.

14. A computer-implemented method for manufacturing a building block, which comprises at least one component, in a production line, the method comprising:
   retrieving an asset-information about the at least one component and a manufacturing tool set, which comprises searching for a raw asset-information about the at least one component and the manufacturing tool set in each database from a list of databases;

conveying the at least one component according to the asset-information by the feeding line to a central conveyor line;

retrieving a processing-information about processing the at least one component, which comprises searching for a raw processing-information about the at least one component in each database from the list of databases, wherein retrieving the processing-information comprises retrieving a semantic relation between a first attribute of the asset-information and a second attribute of the asset-information, wherein the semantic relation between the first attribute and the second attribute of the asset-information comprises a function indicating a mathematical relationship, a physical relationship, and/or an ontological relationship; and processing the at least one component according to the processing-information, wherein the searching for the raw-asset-information and the searching for the raw processing-information in the list of databases is designed for searching among several databases.

15. The computer-implemented method of claim 14, wherein the processing-information includes processing-technique that comprises: to drill, to mill, to turn, and/or to polish the at least one component, and/or to connect at least two components by a substance-to-substance bond, a form-locked connection, and/or a frictional connection.

16. A non-transitory computer-readable storage medium having a program stored therein, which, when executed on a control unit, instructs the control unit to perform the method according to claim 14.

17. The computer-implemented method of claim 14, the method is implemented to manufacture a vehicle or a part of a vehicle.

\* \* \* \* \*